US007238890B2

(12) United States Patent
Shiobara et al.

(10) Patent No.: US 7,238,890 B2
(45) Date of Patent: Jul. 3, 2007

(54) PTFE STUD FOR ULTRAHIGH-VALUE RESISTOR AND METHOD THEREFOR

(75) Inventors: Syunsuke Shiobara, Tokyo (JP); Chikao Matsuda, Tokyo (JP)

(73) Assignee: Agilent Technologies, Inc., Palo Alto, CA (US)

( * ) Notice: Subject to any disclaimer, the term of this patent is extended or adjusted under 35 U.S.C. 154(b) by 21 days.

(21) Appl. No.: 11/157,891

(22) Filed: Jun. 21, 2005

(65) Prior Publication Data

US 2005/0284652 A1 Dec. 29, 2005

(30) Foreign Application Priority Data

Jun. 25, 2004 (JP) ............................ 2004-187313

(51) Int. Cl.
*H02G 3/04* (2006.01)

(52) U.S. Cl. ............................ 174/138 F; 174/138 D; 174/138 E; 174/166 S; 361/785; 335/154

(58) Field of Classification Search ............ 174/138 D, 174/138 E, 138 F, 138 G, 166 S, 168, 267; 361/785, 786, 803, 817, 819, 820, 821, 822, 361/823, 742, 758, 770, 804; 335/154, 202
See application file for complete search history.

(56) References Cited

U.S. PATENT DOCUMENTS

| | | | | |
|---|---|---|---|---|
| 3,302,143 | A * | 1/1967 | Harkenrider | 335/154 |
| 3,621,445 | A * | 11/1971 | Horecky et al. | 174/267 |
| 4,631,639 | A * | 12/1986 | Biraud | 361/807 |
| 5,170,323 | A * | 12/1992 | Perretta et al. | 361/704 |
| 5,888,102 | A * | 3/1999 | Strickland | 361/809 |
| 6,073,349 | A * | 6/2000 | Liversidge | 30/90.7 |
| 6,215,667 | B1 * | 4/2001 | Ady et al. | 361/752 |
| 6,462,281 | B2 | 10/2002 | Uchida et al. | 174/138 |

FOREIGN PATENT DOCUMENTS

JP 2004-187313 6/2004

* cited by examiner

*Primary Examiner*—Dhiru R. Patel

(57) ABSTRACT

A PTFE stud for an ultrahigh-value resistor includes a first portion to be mounted on a substrate and a second portion attached to the first portion so as to not be in contact with the surface of the substrate. The first portion is formed of insulating material and the second portion has a mounting hole that penetrates the second portion so as to be parallel to the surface of the substrate. The mounting hole is adapted such that the lead of the ultrahigh-value resistor is inserted thereinto. The ultrahigh-value resistor can be mounted without soldering.

5 Claims, 2 Drawing Sheets

PTFE STUD FOR ULTRAHIGH-VALUE RESISTOR AND METHOD THEREFOR

BACKGROUND OF THE INVENTION

1. Field of the Invention

The present invention relates to a polytetrafluoroethylene (PTFE) stud for mounting an ultrahigh-value resistor whose characteristics may change due to soldering-induced heat.

2. Description of the Related Art

Ultrahigh-value resistors typically have a resistance of several giga-ohms to several tera-ohms. Known examples include what is disclosed in http://www.hydrazine.co.jp/e_c/pdf/j-pdf/j-rh-u.pdf and http://www.hydrazine.co.jp/e_c/pdf/j-pdf/j-ru.pdf found at http://www.hydrazine.co.jp/e_c/jpn/j_teiko.html.

Those ultrahigh-value resistors are used for, for example, a measuring instrument to detect a micro current. Resistance errors have a large influence on the measurement accuracy. Resistance errors may be caused by, for example, temperature changes. Those ultrahigh-value resistors have an internal structure that is susceptible to thermal stress. Thus, when the ultrahigh-value resistors are mounted by soldering, a shock due to the soldering-induced heat, i.e., thermal stress applied in a short period of time, may render the resistance unstable.

Accordingly, even when a user performs inspection and/or adjusts the value after the manufacture of the measuring instrument, he or she needs to fully allow for the error which otherwise may affect the measurement accuracy of the instrument. Thus, measures, such as mitigating thermal shock or thermal stress by temporarily attaching a heat-dissipating jig to the lead of the ultrahigh-value resistor, have been taken during the soldering of the resistor.

Examples of related art include a stud product, using PTFE (e.g., Teflon®) material, for a printed circuit board and for surface-mounting a PTFE terminal manufactured by Mac Eight Co., Ltd. (2004a159.pdf (http://www.mac8sdk.co.jp/item/teflon_smt/fh.html) and 2004a220.pdf (http://www.mac8sdk.co.jp/item/teflon/fx.html)). In addition, Japanese Unexamined Patent Application Publication No. 2002-8759 (Document 1) discloses a PTFE terminal having a plurality of grooves.

However, the method for mitigating thermal shock by attaching the above-noted heat-dissipating jig has problems in that, for example, the process and procedure for mounting a component become complicated and subsequent maintenance work does not allow soldering. The above-noted stud product using PTFE material requires high insulation between the substrate and the terminal and is not adapted to reduce thermal transmission. Document 1 discloses a technique using PTFE for a highly-insulating stud, and the technique is intended to reduce the area occupied on the substrate and to improve the work efficiency. Document 1, however, does not disclose a technique for reducing thermal transmission.

In a micro-current measurement apparatus, an ultrahigh-value resistor is often air-wired, i.e., wired away from the substrate, with a supporting member interposed therebetween, and application of soldering-induced thermal shock to the ultrahigh-value resistor causes a variation in resistance.

SUMMARY OF THE INVENTION

In view of the situation described above, an object of the present invention is to provide a dedicated supporting member (i.e., a PTFE stud) and a method that allows the mounting of an ultrahigh-value resistor without soldering.

The present invention provides a PTFE stud for an ultrahigh-value resistor. The PTFE stud includes a first portion to be mounted on a substrate and a second portion attached to the first portion so as to not be in contact with a surface of the substrate. The first portion is formed of insulating material, and the second portion has a mounting hole that penetrates the second portion so as to be parallel to the surface of the substrate. Preferably, the first portion is formed of PTFE material having low thermal-conductivity and the ultrahigh-value resistor is attached to the PTFE stud by inserting a lead of the ultrahigh-value resistor into the mounting hole. Preferably, the mounting hole has, at an inner circumferential surface thereof, lug portions that extend from the inner circumferential surface toward a central axis of the mounting hole.

Preferably, the second portion is formed of material that is solderable and that is electrically conductive. Preferably, the first portion has a mounting pin formed of solderable material and the second portion and the mounting pin are spaced apart from each other. In addition, preferably, the second portion has at a top surface thereof a groove for wiring. The groove may be provided above the mounting hole relative to the substrate. Preferably, the longitudinal direction of the groove is substantially perpendicular to the penetration direction of the mounting hole. Preferably, the second portion is rotatably provided on a face that is in contact with the first portion.

The present invention further provides a method for attaching an ultrahigh-value resistor to a substrate by using a PTFE stud. The method includes a step of securing the PTFE stud to the substrate, and a step of providing a wire or an electrical component in a groove of the secured PTFE stud and performing air wiring on the PTFE stud. The method further includes a step of attaching the ultrahigh-value resistor to the PTFE stud after the air wiring, by inserting a lead of the ultrahigh-value resistor into a mounting hole of the PTFE stud and bending the lead.

The PTFE stud according to the present invention includes a first portion to be mounted on a substrate and a second portion attached to the first portion so as to not be in contact with a surface of the substrate. The first portion is formed of insulating material, and the second portion has a mounting hole that penetrates the second portion so as to be parallel to the surface of the substrate. This arrangement, therefore, eliminates the need for soldering the lead of the ultrahigh-value resistor after inserting the lead into the mounting hole, thus preventing thermal shock from being applied to the ultrahigh-value resistor. Even when another component on the substrate is soldered after the ultrahigh-value resistor is attached, the first portion blocks some of the soldering heat that is transmitted from the substrate to thereby make it difficult for the heat to be transmitted to the second portion. This arrangement, therefore, can prevent thermal shock from being applied to the ultrahigh-value resistor. Thus, when an ultrahigh-value resistor is used in a measuring instrument or the like, the resistance of the ultrahigh-value resistor does not become unstable, thus eliminating the need to allow for an extra margin of error in measurement after the assembly. This arrangement further eliminates the process for temporarily attaching a heat-dissipating jig to a portion to be soldered, thereby making it possible to simplify the assembly process. Additionally, even for component replacement and/or periodic inspection during maintenance, the use of solder is not required for attaching/detaching the ultrahigh-value resistor. Thus, the measuring instrument does not generate an error.

In addition, since the first portion is formed of PTFE material having low thermal conductivity, the manufacturing cost of the first portion can be reduced. Further, since the ultrahigh-value resistor is attached by inserting the lead of the ultrahigh-value resistor into the mounting hole and bending the lead, it is possible to more reliably attach the ultrahigh-value resistor to the second portion without soldering the lead. Additionally, the mounting hole has at the inner circumferential surface thereof an engaging lug that extends from the inner circumferential surface toward the central axis of the mounting hole. Thus, upon the insertion of the lead of the ultrahigh-value resistor into the mounting hole, the lead and the engaging lug are in reliable contact with each other. As a result, it is possible to achieve stable continuity without fixing the lead with solder.

Since the second portion is formed of material that is solderable and that is electrically conductive, the air wiring can be performed by soldering to electrically connect the ultrahigh-value resistor and the wiring. Since the first portion has the mounting pin formed of solderable material, the PTFE stud can be mounted on the substrate by soldering. With the structure that allows soldering, the PTFE stud can be mounted together with another electrical component by using a reflow soldering apparatus or the like, thereby making it possible to simplify the process for mounting the PTFE stud. Since the second portion and the mounting pin are arranged so that they are thermally independent of each other, some of the heat induced when another component is soldered onto the substrate is blocked by the first portion. This, therefore, makes it difficult for the heat to be transmitted to the second portion and can prevent thermal shock from being applied to the ultrahigh-value resistor.

Moreover, the second portion has at a top surface thereof a groove for wiring, the longitudinal direction of the groove being substantially parallel to the surface of the substrate, and the groove is provided above the mounting hole relative to the substrate. This arrangement can facilitate the air wiring process. Since the longitudinal direction of the groove is substantially perpendicular to the penetration direction of the mounting hole, the process for attaching the ultrahigh-value resistor is not hampered by the air wiring, to thereby facilitate the attachment. Since the groove and the mounting hole are substantially perpendicular to each other, it is possible to prevent the through-hole from being closed by solder flowing out when soldering is performed on the groove. In addition, the second portion is rotatably provided on a face that is in contact with the first portion. Thus, there is no need to care about the direction of the mounting hole when mounting the PTFE stud onto the substrate. Further, when inserting the jig or the lead of the ultrahigh-value resistor into the mounting hole, it is possible to easily direct the mounting hole in the insertion direction.

The method according to the present invention includes a step of securing the PTFE stud to the substrate, and a step of providing a wire or an electrical component in a groove of the secured PTFE stud and performing air wiring on the PTFE stud. The method further includes a step of attaching the ultrahigh-value resistor to the PTFE stud after the air wiring, by inserting a lead of the ultrahigh-value resistor into a mounting hole of the PTFE stud and bending the lead. This method can prevent thermal shock from being applied to the ultrahigh-value resistor and also can facilitate the attachment of the ultrahigh-value resistor to the PTFE stud.

DESCRIPTION OF THE PREFERRED EMBODIMENT

Figure 1C:
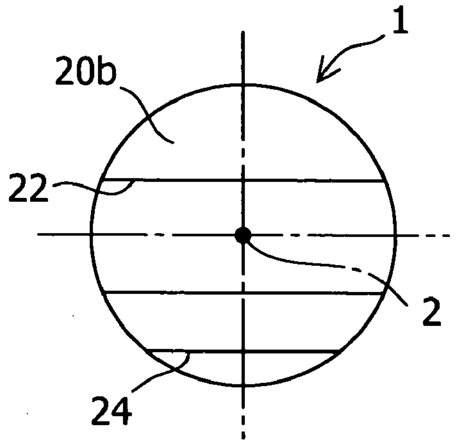
FIG. 1C is a top view thereof.
Figure 1B:
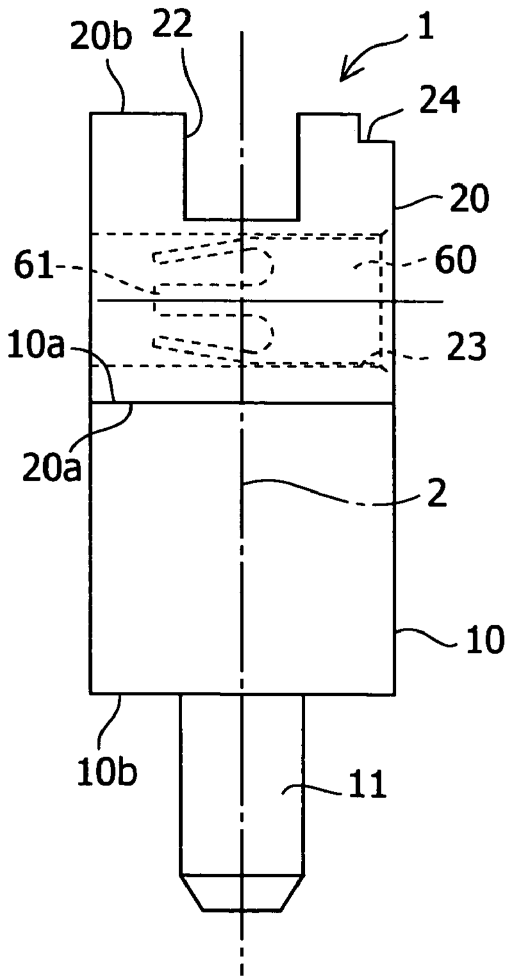
FIG. 1B is a side view thereof.
Figure 1A:
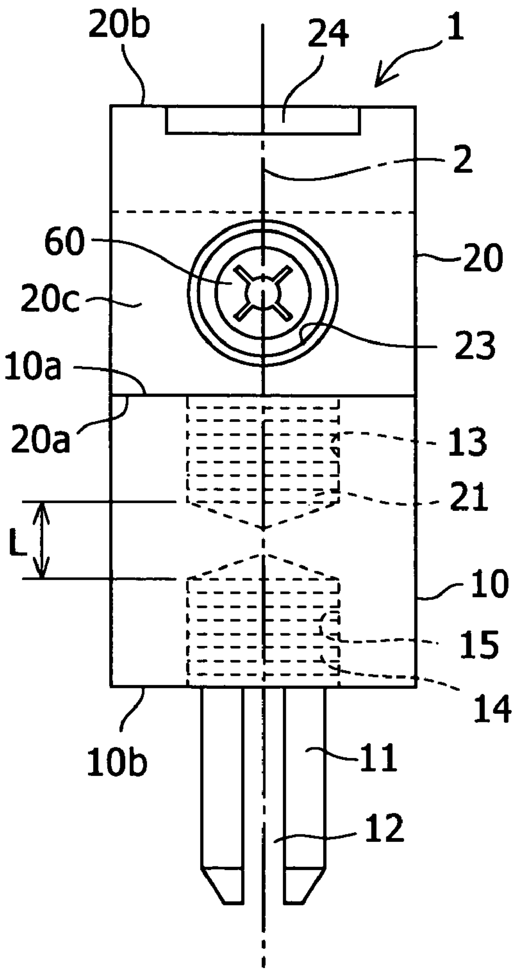
FIG. 1A is a front view of a PTFE stud according to the present invention.

A PTFE (polytetrafluoroethylene) stud according to an embodiment of the present invention will be described below with reference to FIGS. 1A to 1C and 2A to 2D. FIG. 1A is a front view of a PTFE stud according to the present invention, FIG. 1B is a side view thereof, and FIG. 1C is a top view thereof. FIGS. 2A to 2D show processes for mounting PTFE studs on a substrate and then attaching an ultrahigh-value resistor to the PTFE studs.

As shown in FIGS. 1A to 1C, a PTFE stud 1 is formed to have a substantially-cylindrical shape along a central axis 2 and is constituted by a first portion 10 formed of PTFE material and a second portion 20 formed of brass. The first portion 10 and the second portion 20 have a face 10*a* and a face 20*a*, respectively, which are perpendicular to the central axis 2. The first portion 10 and the second portion 20 are separated from each other at the faces 10*a* and 20*a* and are combined together such that the faces 10*a* and 20*a* are in contact with each other.

The first portion 10 has a substantially-cylindrical mounting pin 11 at a face 10*b* that is opposite to the face 10*a*. The mounting pin 11 is formed of solderable material and brass is used therefor in the present embodiment. The mounting pin 11 projects from the face 10*b* in the direction of the central axis 2, and the protrusion has a slit 12 formed from one end (i.e., the tip) of the mounting pin 11 to the surface 10*b* along the central axis 2. The other end of the mounting pin 11 has a threaded portion 14. This threaded portion 14 is fitted into a mounting hole 15, provided in the surface 10*b*, by a method, such as screwing or pressing.

The second portion 20 has a screw portion 21 that projects from the surface 20*a* along the central axis 2. The screw portion 21 is integrally formed with the second portion 20 and is fitted into a mounting hole 13, provided in the surface 10*a* of the first portion 10, by a method such as screwing or pressing. Preferably, the second portion 20 is designed to shake the head, i.e., to rotate with the surface 20*a* being in contact with the first portion 10, so that the first portion 20 can be finely-adjusted after being mounted on a substrate.

Thus, the screw portion 21 and the threaded portion 14 are located adjacent to each other, but the adjacent portions are spaced apart from each other by dimension L, as shown in FIG. 1A. In the present embodiment, dimension L is about 1.0 mm or more.

A side circumferential surface 20*c* of the second portion 20 has a through-hole (a mounting hole) 23 in a direction substantially perpendicular to the central axis 2. The through-hole 23 has therein an engaging lug 60 formed of electrically conductive material. The engaging lug 60 is inserted into the through-hole 23 so that the inner circumferential surface of the through-hole 23 and the outer circumferential surface of the engaging lug 60 engage with each other. The engaging lug 60 has four lug portions 61, which extend from the inner circumferential surface of the through-hole 23 toward the central axis of the through-hole 23. The lug-portions 61 are arranged with spacing therebetween in the circumferential direction and are obliquely directed in the insertion direction of a lead of an ultrahigh-value resistor, described below. The lug portions 61 are elastic, so that they deform toward the inner-circumferential surface of the through-hole 23 upon insertion of the lead.

A groove 22 is provided in a face 20*b*, which is opposite to the face 20*a*, so as to extend in a direction substantially perpendicular to the central axis 2 and substantially perpendicular to the direction of the through-hole 23. The second portion 20 further has a step portion 24 at an edge of the face 20*b* so as to be parallel to the groove 22 for indicating the direction of the engaging lug 60 in the through-hole 23.

Next, a method for mounting the PTFE studs according to the embodiment of the present invention and a method for attaching an ultrahigh-value resistor will be described in conjunction with a mounting procedure with reference to FIGS. 2A to 2D.

1) Each dedicated PTFE stud 1 is mounted on a substrate 30. In the embodiment, this process is performed by inserting the mounting pin 11 into a hole provided in the substrate 30.

2) Solder is applied to the substrate 30 and each PTFE stud 1 is secured to the substrate 30. This soldering process is performed by reflow soldering. The soldering can also be performed manually.

Figure 2A:
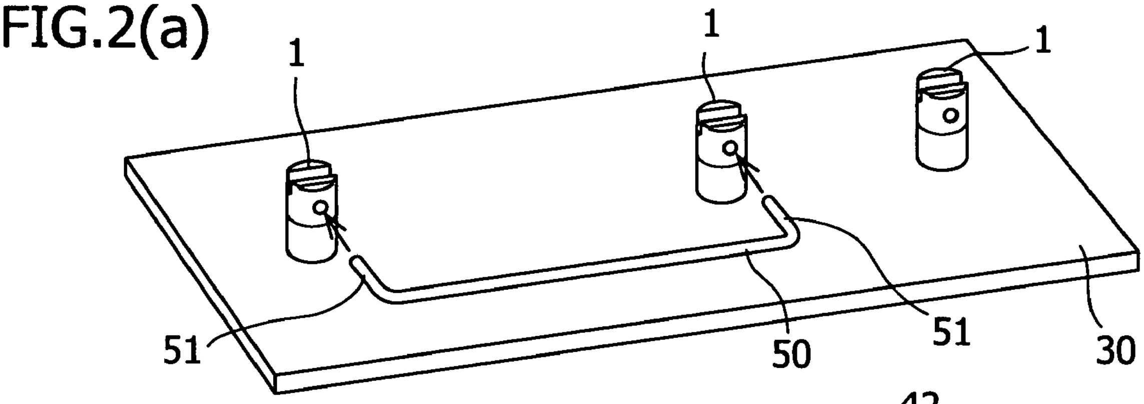
FIGS. 2A to 2D show processes for mounting PTFE studs on a substrate and then attaching an ultrahigh-value resistor to the PTFE studs.

3) The second portion 20 of each PTFE stud 1 is rotated relative to the first portion 10 and a jig 50 is inserted into the through-hole 23 of the PTFE stud 1 (see FIG. 2A). This process aligns the directions of the through-holes 23. The jig 50 has a structure in which a piece of wire or the like is bent into a substantially U shape so that two opposite ends 51 thereof, the ends corresponding to the lead of an ultrahigh-value-resistance, are inserted into the respective through-holes 23.

Figure 2B:
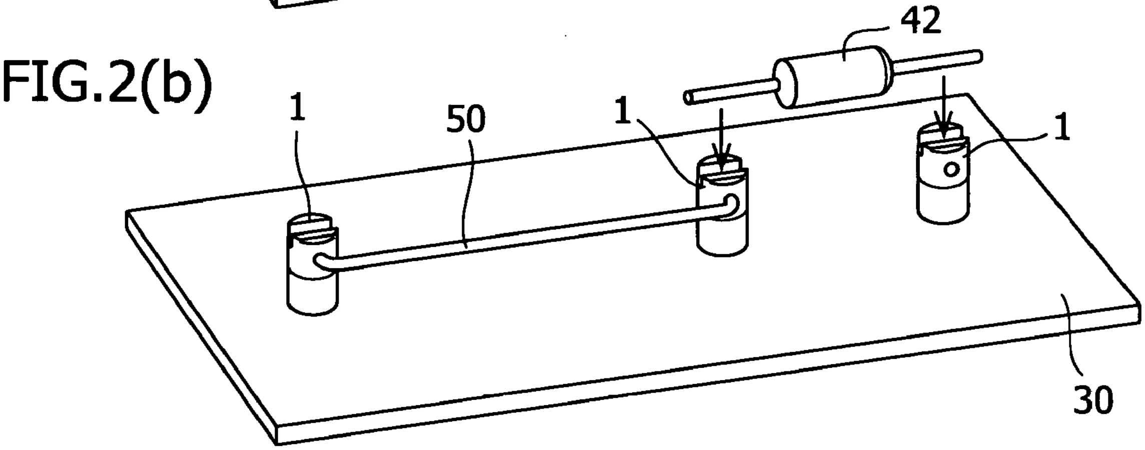

4) Next, air wiring is performed (see FIG. 2B). During the air wiring, a wiring member or another component 42 is placed in the grooves 22 from the above of the PTFE studs 1 and portions of the grooves 22 are soldered.

Figure 2C:
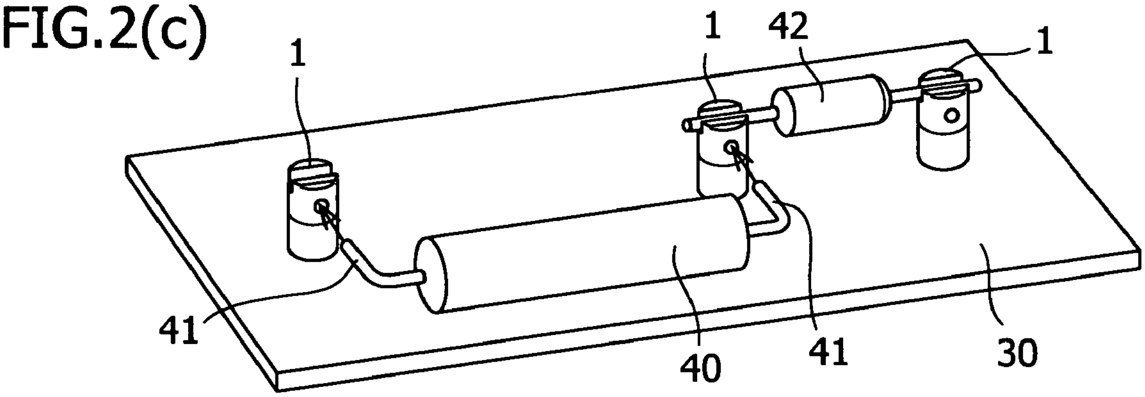
Figure 2D:
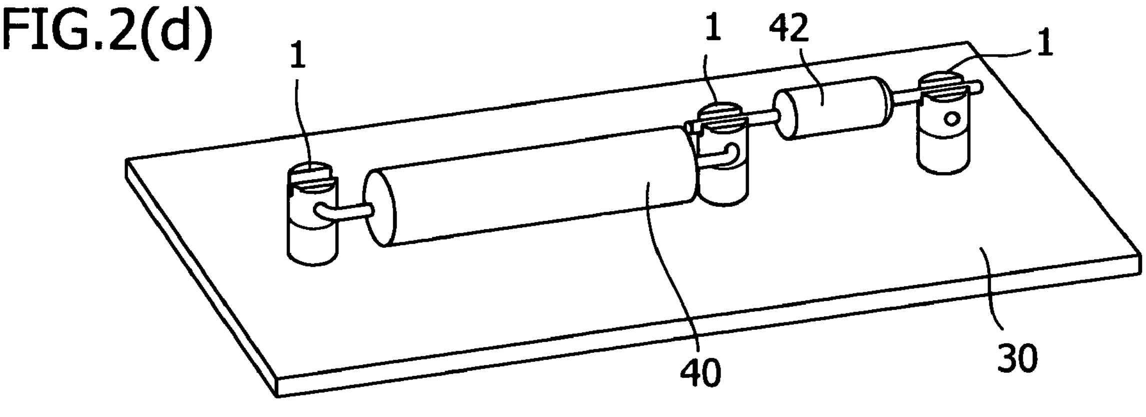

5) The jig 50 is removed. Thereafter, as shown in FIG. 2C, a lead 41 of an ultrahigh-value resistor 40 is inserted into the through-holes 23. The ends of the lead 41 which project from the through-holes 23 are bent so that the ultrahigh-value resistor 40 does not come out of the through-holes 23, thereby attaching the ultrahigh-value resistor. Thus, no soldering is performed. FIG. 2D shows a state in which the ultrahigh-value resistor 40 is attached.

As is understood from the processes described above, with the PTFE stud 1 for an ultrahigh-value resistor according to the embodiment of the present invention, when the ultrahigh-value resistor 40 is fitted into the through-holes 23, the lead 41 is caused to project from the through-holes 23 and the lead 41 is bent to allow the ultrahigh-value resistor 40 to be attached to the second portion 20. This eliminates the need for soldering the lead 41, thereby preventing thermal shock from being applied to the ultrahigh-value resistor 40. Even when another component on the substrate 30 is soldered after the ultrahigh-value resistor 40 is attached, the first portion 10 blocks some of the heat induced by soldering, thereby making it difficult for the heat to be transmitted to the second portion 20. This arrangement, therefore, can prevent thermal shock from being applied to the ultrahigh-value resistor 40.

When the lead 41 is inserted into the through-hole 23, the lead 41 engages with the lug portions 61 of the engaging lug 60. This makes it possible to ensure stable electrical continuity. Additionally, the PTFE stud 1 can be mounted on a substrate by soldering. With the structure that allows soldering, the PTFE stud 1 can be mounted together with another electrical component by using a reflow soldering apparatus or the like, thereby making it possible to simplify the process for mounting the PTFE stud 1. Since the second portion 20 and the mounting pin 11 are arranged so that they are thermally independent of each other, some of the heat induced when another component is soldered onto the substrate 30 is blocked by the first portion 10. This, therefore, makes it difficult for the heat to be transmitted to the second portion 20 and makes it possible to prevent thermal shock from being applied to the ultrahigh-value resistor 40.

Moreover, soldering can be performed on the groove 22 that has been used for air wiring and the ultrahigh-value resistor 40 and the air wiring 42 can be electrically connected. Also, the air wiring process can easily be performed.

While the best mode of the present invention has been described above, the present invention is not limited thereto. Thus, various modifications and changes are also possible without departing from the spirit and scope of the present invention. For example, when a surface-mounting-type substrate that does not have a hole in the substrate surface is used, the mounting pin 11 used in the embodiment can be replaced with a mounting plate having a flat surface that is in contact with the pattern of the substrate surface.

While the first portion 10 has been described as being formed of PTFE material in the embodiment, any insulating material that has high thermal-resistance and low thermal-conductivity can be used. Further, while the second portion 20 and the mounting pin 11 have been described as being formed of brass, any material that is suitable for the soldering process and that exhibits satisfactory conductivity can be used in the present invention.

What is claimed is:

1. A polytetrafluoroethylene stud for an ultrahigh-value resistor, comprising: a first portion to be mounted on a substrate; a second portion attached to the first portion so as to not be in contact with a surface of the substrate, wherein the first portion is formed of insulating material and the second portion has a mounting hole that penetrates the second portion and that is substantially parallel to the surface of the substrate,and wherein the mounting hole has, at an inner circumferential surface thereof, lug portions that extend from the inner circumferential surface toward a central axis of the mounting hole.

2. A polytetrafluoroethylene stud for an ultrahigh-value resistor, comprising: a first portion to be mounted on a substrate; a second portion attached to the first portion so as to not be in contact with a surface of the substrate, wherein the first portion is formed of insulating material and the second portion has a mounting hole that penetrates the second portion and that is substantially parallel to the surface of the substrate, and wherein the second portion has at a top surface thereof a groove for wiring, the groove being provided above the mounting hole relative to the substrate.

3. The polytetrafluoroethylene stud according to claim 2, wherein the longitudinal direction of the groove is substantially perpendicular to the penetration direction of the mounting hole.

4. A method for attaching an ultrahigh-value resistor to a substrate by using a polytetrafluoroethylene stud according to claim 2, the method comprising the steps of:

securing the polytetrafluoroethylene stud to the substrate;

providing a wire or an electrical component in a groove of the secured polytetrafluoroethylene stud and performing air wiring on the polytetrafluoroethylene stud; and attaching the ultrahigh-value resistor to the polytetrafluoroethylene stud after the air wiring, by inserting a lead of the ultrahigh-value resistor into a mounting hole of the polytetrafluoroethylene stud and bending the lead.

5. A polytetrafluoroethylene stud for an ultrahigh-value resistor, comprising: a first portion to be mounted on a substrate; a second portion attached to the first portion so as to not be in contact with a surface of the substrate, wherein the first portion is formed of insulating material and the second portion has a mounting hole that penetrates the second portion and that is substantially parallel to the surface of the substrate, and wherein the second portion is rotatably provided on a face that is in contact with the first portion.

* * * * *